US010315891B2

(12) United States Patent
White

(10) Patent No.: US 10,315,891 B2
(45) Date of Patent: Jun. 11, 2019

(54) BEAM INTERLOCK FOR HOIST TROLLEY

(71) Applicant: Harrington Hoists, Inc., Manheim, PA (US)

(72) Inventor: Christopher A. White, Lebanon, PA (US)

(73) Assignee: Harrington Hoists, Inc., Manheim, PA (US)

( * ) Notice: Subject to any disclaimer, the term of this patent is extended or adjusted under 35 U.S.C. 154(b) by 251 days.

(21) Appl. No.: 15/342,607

(22) Filed: Nov. 3, 2016

(65) Prior Publication Data

US 2018/0118524 A1 May 3, 2018

(51) Int. Cl.

| | |
|---|---|
| ***B66C 17/00*** | (2006.01) |
| ***F16B 7/22*** | (2006.01) |
| ***B66C 7/12*** | (2006.01) |
| ***B66C 7/16*** | (2006.01) |

(52) U.S. Cl.

CPC ................ *B66C 17/00* (2013.01); *B66C 7/12* (2013.01); *B66C 7/16* (2013.01); *F16B 7/22* (2013.01)

(58) Field of Classification Search

CPC .... B66C 6/00; B66C 7/00; B66C 7/02; B61B 3/00; B61B 13/00; E01B 25/22; E01B 25/24

See application file for complete search history.

(56) References Cited

U.S. PATENT DOCUMENTS

| | | | | |
|---|---|---|---|---|
| 1,053,667 A | | 2/1913 | Steedman | |
| 1,553,439 A | | 9/1925 | Goldberg | |
| 2,276,272 A | | 3/1942 | Harris et al. | |
| 2,414,301 A | | 1/1947 | Harris | |
| 2,471,513 A | | 5/1949 | Bogle | |
| 2,922,382 A | | 1/1960 | Pilipczuk | |
| 3,132,598 A | | 5/1964 | Pearson | |
| 3,468,264 A | * | 9/1969 | Horompo | B66C 7/14 104/98 |
| 4,509,431 A | | 4/1985 | Laskowski | |
| 5,784,965 A | | 7/1998 | Zaguroli et al. | |
| 6,708,622 B2 | | 3/2004 | Bergeron | |
| 7,516,875 B2 | | 4/2009 | Gouldson | |
| 2011/0005800 A1 | | 1/2011 | Magno et al. | |

OTHER PUBLICATIONS

TC/American. "Interlocks—325 Series: 3I-9A; 3I-9B Crane Interlock and Operating Mechanism, 3I-10A; 3I-10B Connecting Interlock." Installation Instructions, Nov. 2013, 20 pages.

* cited by examiner

*Primary Examiner* — Robert J McCarry, Jr.

(57) ABSTRACT

Aspects of the present disclosure are directed toward apparatuses, systems, and methods for releasably connecting a first beam to a second beam. The apparatuses, systems, and methods may include a locking pin arranged on the first beam and configured to actuate between an unlocked position and a locked position and an arm coupled to the locking pin and extending parallel therewith. The apparatuses, systems, and methods may also include a sleeve arranged on the second beam and configured to receive the locking pin in the locked position to releasably secure the first beam to the second beam.

18 Claims, 6 Drawing Sheets

BEAM INTERLOCK FOR HOIST TROLLEY

FIELD

The present disclosure relates generally to overhead lifting equipment. More specifically to apparatuses, systems, and methods that relate to an interlock for connecting beams to one another for traversing of a crane therebetween.

BACKGROUND

Various types of overhead cranes may be useful for material handling. Overhead cranes may traverse along fixed rails that may be arranged within a building (or other structure), external to the building (or other structure), or a combination thereof. The fixed rails may be connected to the building or may be a separate frame configured for the overhead crane.

Runway cranes are types of overhead cranes that move/traverse along fixed rails. Runway cranes may carry a trolley and hoist used for material handling. In certain instances, it may be desirable to allow for the runway crane to move/traverse outside the bounds of the fixed rails to which the runway crane is originally arranged.

SUMMARY

Various aspects of the present disclosure are directed toward apparatuses, systems and methods for releasably connecting a first beam to a second beam. The interlock apparatuses, systems, and methods may include a locking pin arranged on the first beam and configured to actuate between an unlocked position and a locked position. The interlock apparatuses, systems, and methods may also include an arm coupled to the locking pin and extending parallel therewith. The arm may be configured to transition a first stop mechanism between a blocking position and an unblocking position. In addition, the first stop mechanism being arranged at a lower surface of the first beam and extending therethrough. In certain instances, the interlock apparatuses, systems, and methods may further include a sleeve arranged on the second beam and configured to receive the locking pin in the locked position to releasably secure the first beam to the second beam.

Various aspects of the present disclosure are also directed toward apparatuses, systems and methods that include an interlock mechanism configured to releasably secure a first beam to a second beam. The interlock mechanism may include a locking pin arranged on the first beam and configured to actuate between an unlocked position and a locked position. In certain instances, the interlock mechanism includes a first stop mechanism arranged at a lower surface of the first beam and extending therethrough and configured to actuate between a blocking position and an unblocking position and a second stop mechanism arranged at a lower surface of the second beam and extending therethrough and configured to actuate between a blocking position and an unblocking position. The interlock mechanism may also include an arm coupled to the locking pin and extending parallel therewith. The first arm may be configured to transition the first stop mechanism between the blocking position and the unblocking position and the second mechanism between the blocking position and the unblocking position. In addition, the interlock mechanism may include a sleeve arranged on the second beam and configured to receive the locking pin in the locked position.

Aspects of the present disclosure may also be directed toward methods for releasably connecting a first beam to a second beam that include arranging the first beam adjacent the second beam and actuating a locking pin, arranged on the first beam, to span the first beam and the second beam. The methods may also include actuating an arm, coupled to the locking pin and extending parallel therewith, simultaneously with the locking pin and transitioning a first stop mechanism between a blocking position and an unblocking position, the first stop mechanism being arranged at a lower surface of the first beam and extending therethrough. Further, the methods may include receiving the locking pin in a sleeve arranged on the second beam to releasably secure the first beam to the second beam.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

Figure 1:
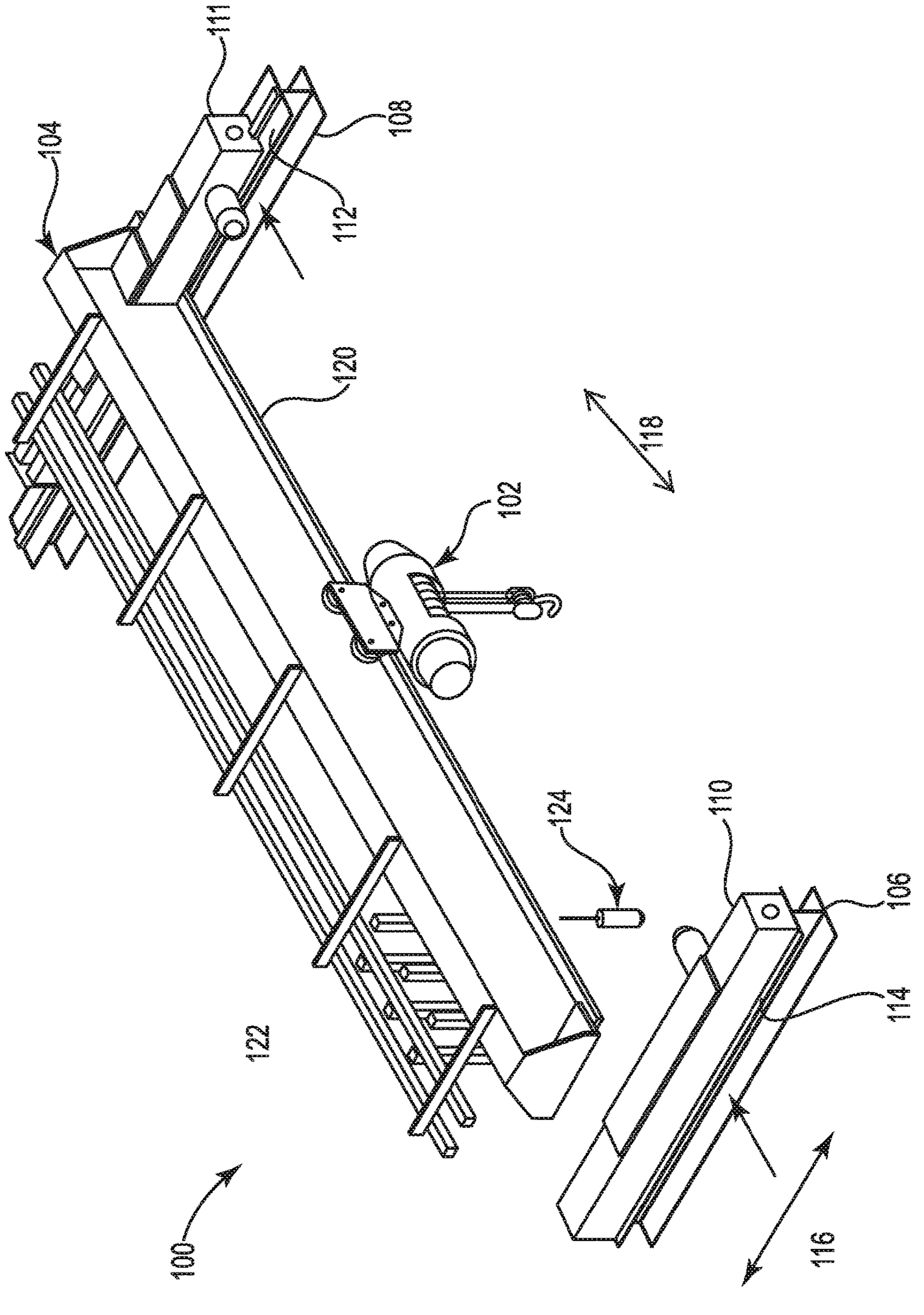
FIG. 1 is an illustration of example crane system consistent with various aspects of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

DETAILED DESCRIPTION

Various aspects of the present disclosure are directed toward customizable solutions for runway cranes. Runway cranes may be custom fit to meet requirements of a structure and addition for the working environment of the runway crane. A bridge crane structure, including one or more fixed beams, may be fit within the working environment, as is shown in FIG. 1.

FIG. 1 is an illustration of example crane system 100 consistent with various aspects of the present disclosure. The crane system 100, which may be a bridge crane, includes a trolley hoist 102 and a bridge girder 104 that may be arranged within a building structure. Each end of the bridge girder 104 may be coupled to a runway girders 106, 108. The bridge girder 104 may be directly coupled to the runway girders 106, 108 or, as described in further detail below, the bridge girder 104 may be coupled to the runway girders 106, 108 via end trucks 110, 111. In certain instances, the bridge girder 104 and the runway girders 106, 108 may be mounted or attached to walls of the building structure. In other instances, the crane system 100 may include vertical supports (not shown) to position the bridge girder 104 and the runway girders 106, 108 vertically about the ground of the building structure. The bridge girder 104 and the runway girders 106, 108 may be positioned at a working location above the working operation.

In certain instances, the end trucks 110, 111 may be attached to ends of the bridge girder 104. The end trucks 110, 111 may be arranged on top surfaces 112, 114 of the runway girders 106, 108. In other instances, the end trucks 110, 111 are arranged on a bottom surface of the runway girders 106, 108. In certain instances, the end trucks 110, 111 may be motorized. In these such instances, the end trucks 110, 111 may be configured to translate or move the bridge girder 104 (and the trolley hoist 102) along the top surfaces 112, 114 of the runway girders 106, 108. The motorized end trucks 110, 111 may translate or move the bridge girder 104 (and the trolley hoist 102) in a first direction 116. The trolley hoist 102 may be configured to translate or move in a second direction 118 along a lower portion 120 of the bridge girder 104. The second direction 118 may be perpendicular to the first direction 116. Power may be provided to the motorized end trucks 110, 111 via conductors 122 arranged with the bridge girder 104.

The crane system 100 may also include a remote 124. The remote 124 may operate the end trucks 110, 111 and/or the trolley hoist 102. In addition, the remote 124 may communicate with the end trucks 110, 111 and/or the trolley hoist 102 wirelessly and transmit control signals thereto.

The trolley hoist 102 may lower and raise material or equipment and transport the material or equipment within by moving along the lower portion 120 of the bridge girder 104 between the end trucks 110, 111 in the second direction 118. The end trucks 110, 111 being motorized may extend the working area for the trolley hoist 102 in the first direction 116 and allow for the trolley hoist 102 to raise and lower material in the first direction 116 along the length of the runway girders 106, 108.

The runway girders 106, 108 are fixed within the building structure. Thus, the bounds of the bridge girder 104 and the runway girders 106, 108 may limit the operable range of the runway trolley hoist 102. In certain instances, it may be desirable to extend the operable range of the runway trolley hoist 102 beyond the bounds of the bridge girder 104 and the runway girders 106, 108. More specifically, the trolley hoist 102 may be transferred from the bridge girder 104 and the runway girders 106, 108 to a secondary or extension beam structure to extend the operable range of the trolley hoist 102.

Figure 2:
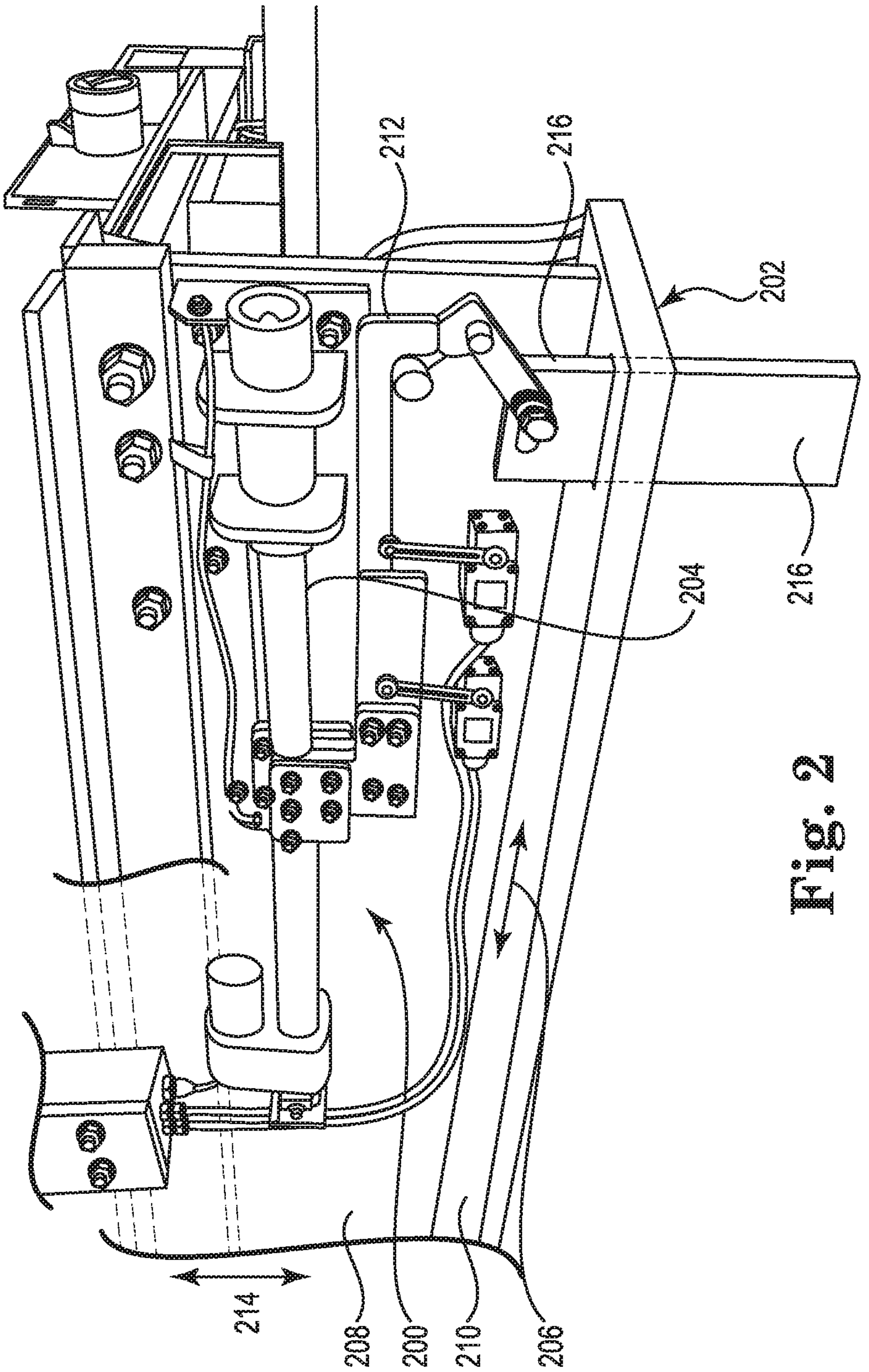
FIG. 2 is an illustration of example beam interlock consistent with various aspects of the present disclosure.

FIG. 2 is an illustration of example crane interlock 200 consistent with various aspects of the present disclosure. The crane interlock 200 may be used for releasably connecting a first beam 202 to a second beam (not shown). The first beam 202 may be mounted within a building structure similar to the bridge girder 104 discussed with reference to FIG. 1. The second beam may be secondary or extension beam structure to extend the operable range of a trolley hoist (not shown) originally arranged with the first beam 202. To ensure safety of the working environment in which the first beam 202 (and the trolley hoist arranged therewith) and the second beam are arranged, the crane interlock 200 may be configured to ensure the accurate, safe, and efficient transfer of the trolley hoist from the first beam 202 to the second beam.

The crane interlock 200 may include a locking pin 204 arranged on the first beam 202 and configured to actuate between an unlocked position and a locked position. The locking pin 204 may translate between the unlocked position and the locked position in a first direction 206 along a horizontal surface 208 of the first beam 202. The locking pin 204 is shown in the unlocked position in FIG. 2. The first beam 202 may also include a lower surface 210. The lower surface 210 of the first beam 202 may be arranged perpendicular to the horizontal surface 208 of the first beam 202. In addition the lower surface 210 of the first beam 202 may extend axially from the lower surface 210 of the first beam 202 and provide a surface for the trolley hoist to translate or move along. As a result, the trolley hoist (not shown) is configured to move along the lower surface 210 of the first beam 202 in the first direction 206.

The crane interlock 200 may also include an arm 212 coupled to the locking pin 204. The arm 212 may extend parallel with the locking pin 204. In addition, the arm 212 may be offset from the locking pin 204 in a second direction 214 (perpendicular to the first direction 206). The arm 212 may be configured to transition a first stop mechanism 216 between a blocking position and an unblocking position. As shown in FIG. 2, the first stop mechanism 216 is arranged at the lower surface 210 of the first beam 202 and extends therethrough. The first stop mechanism 216 is arranged to block the trolley hoist from moving or running-off the lower surface 210 of the first beam 202. The first stop mechanism 216 provides an end point for the trolley hoist to traverse, and may be raised when the locking pin 204 is in the locked position. The first stop mechanism 216 may be coupled to a portion of the arm 212 or a surface of the arm 212 may contact the portion of the first stop mechanism 216 to raise and lower the first stop mechanism 216.

The illustrative components shown in FIG. 2 are not intended to suggest any limitation as to the scope of use or functionality of embodiments of the disclosed subject matter. Neither should the illustrative components be interpreted as having any dependency or requirement related to any single component or combination of components illustrated therein. Additionally, any one or more of the components depicted in any of the FIG. 2 may be, in embodiments, integrated with various other components depicted therein (and/or components not illustrated), all of which are considered to be within the ambit of the disclosed subject matter.

Figure 3:
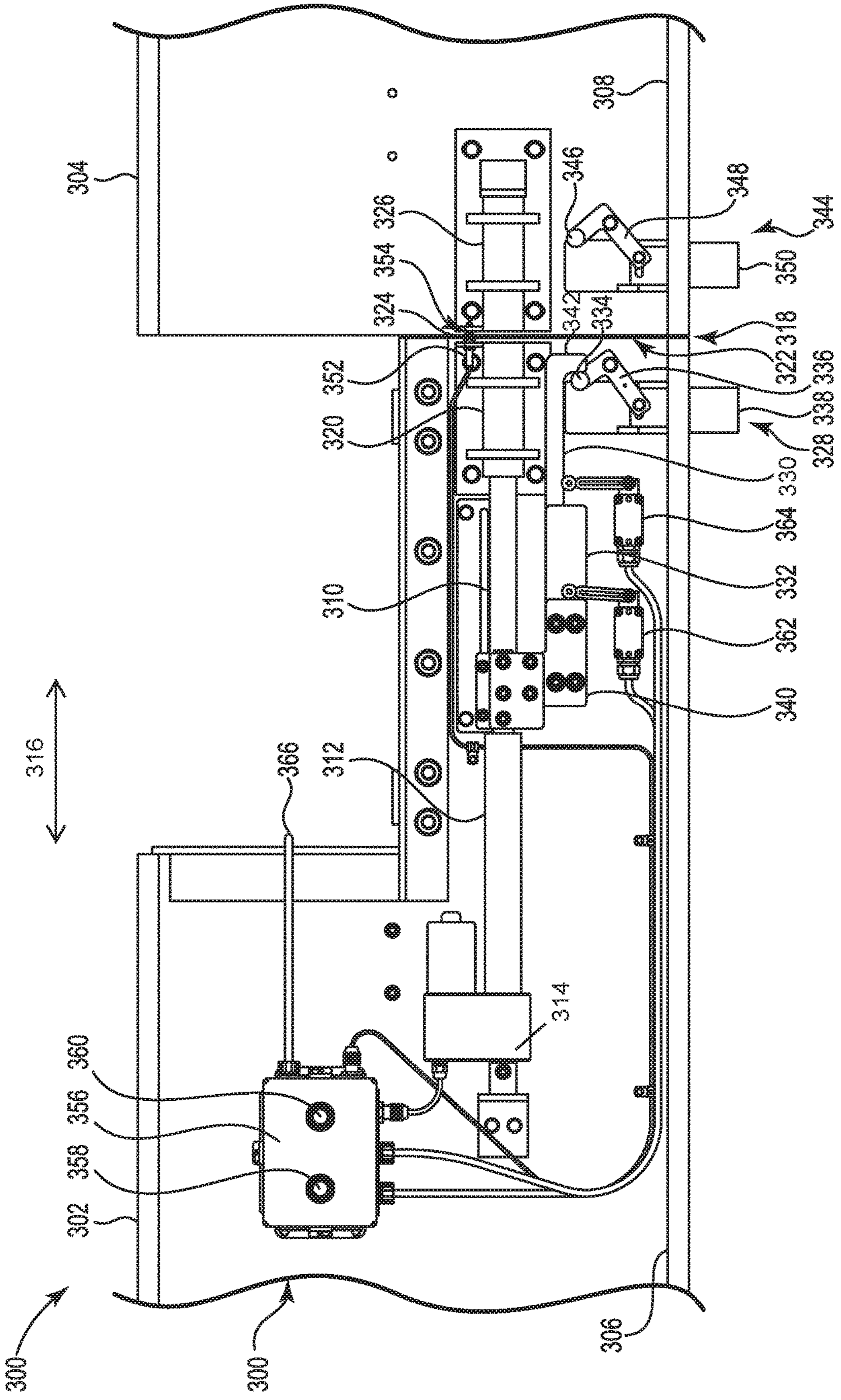
FIG. 3 is an illustration of another example beam interlock consistent with various aspects of the present disclosure.

FIG. 3 is an illustration of another example crane interlock 300 consistent with various aspects of the present disclosure. The crane interlock 300 may be used for releasably connecting a first beam 302 to a second beam 304. The first beam 302 may be mounted within a building structure similar to the bridge girder 104 discussed with reference to FIG. 1 and the second beam 304 may be secondary or extension beam structure to extend the operable range of a crane (not shown) originally arranged with the first beam 302. The crane interlock 300 may be configured and arranged to ensure safety of the working environment in which the first beam 302 (and the crane arranged therewith) and the second beam 304 by releasably locking the first beam 302 to the second beam 304. More specifically, the trolley hoist may originally move along a lower surface 306 of the first beam 302. The trolley hoist may be configured to transition to the second beam 304 and move along a lower surface 308 thereof. As a result, the crane interlock 300 may temporarily or releasably lock the first beam 302 to the second beam 304 to provide a consistent transition between the lower surface 306 of the first beam 302 and the lower surface 308 of the second beam 304.

More specifically, the crane interlock 300 may include a locking pin 310 arranged on the first beam 302 and configured to actuate between an unlocked position and a locked position. The locking pin 310 may be driven by a linear actuator 312 that is driven by a motor 314. The locking pin 310 may transition in a first direction 316 horizontally translate between the unlocked position and the locked position. In the unlocked position, the locking pin 310 is maintained within the bounds of the first beam 302, while in the locked position, the locking pin 310 spans a gap 318 between an end 322 of the first beam 302 and an end 324 of the second beam 304. The locking pin 310, which may be steel, may horizontally translate through a first sleeve 320 in transition across the gap between the first beam 302 and the second beam 304. The first sleeve 320 may abut the end 322 of the first beam 302 and may facilitate locking of the first beam 302 to the second beam 304. More specifically, the first sleeve 320 enhance the structural stability of the locking pin 310 by surrounding the locking pin 310 and providing circumferential support to the locking pin 310.

The locking pin 310 spans the gap 318 between the first beam 302 and the second beam 304 in the locked position and may be received in a second sleeve 326. More specifically, the second sleeve 326 is arranged on the second beam 304 and configured to receive the locking pin 310 in the locked position to releasably secure the first beam 302 to the second beam 304. The second sleeve 326 may provide structural stability to the locking pin 310 and may also mitigate against the first beam 302 separating from the second beam 304. The second sleeve 326 may have a friction fit with the locking pin 310. In other instances, the linear actuator 312 may lock once the locking pin 310 is received within the second sleeve 326 to releasably secure the first beam 302 to the second beam 304.

As noted above, the trolley hoist may be transferred from the first beam 302 to the second beam 304. In order to mitigate against the trolley hoist falling or moving off the first beam 302 when the second beam 304 is not in position for the transfer, the crane interlock 300 may include a first stop mechanism 328. The first stop mechanism 328 may be arranged and extend through the lower surface 306 of the first beam 302. The first stop mechanism 328 provides a stopping point for the trolley hoist along the lower surface 306 of the first beam 302. The first stop mechanism 328 is shown a blocking configuration in FIG. 3. To transition the first stop mechanism 328 to an unblocking position and to allow for the trolley hoist to transition the second beam 304, the crane interlock 300 may include arms 330, 332.

The arms 330, 332 may be coupled to the locking pin 310 and may extend parallel therewith. In addition, the arms 330, 332 may be vertically offset from the locking pin 310 (in a direction perpendicular to the first direction 316). The arms 330, 332 may be configured to transition the first stop mechanism 338 between a blocking position and an unblocking position by translating horizontally in the first direction 316. In certain instances, the arm 330 may be directly connected or coupled to the first stop mechanism 328. In other instances, the arm 330 may include a first contact portion 332 that is configured to contact an upper portion 334 of the first stop mechanism 328.

The upper portion 334 of the first stop mechanism 328 is connected to a first linkage 336, which is in turn connected to a blocking portion 338. The upper portion 334, the first linkage 336, and the blocking portion 338 together may form the first stop mechanism 328. The arm 330 is separate from the first linkage 336 and the upper portion 334 in the blocking position shown in FIG. 3. In transitioning the first stop mechanism 328 between the blocking position and the unblocking position, the first contact portion 332 of the arm 330 may translate horizontally in the first direction 316 and contact the upper portion 334 of the first stop mechanism 328. The arm 332 may continue to translate horizontally and push the upper portion 334 of the first stop mechanism 328 horizontally along therewith. The movement of the upper portion 334 of the first stop mechanism 328 may in turn operate the linkage 336, which may raise the blocking portion 338 of the first stop mechanism 328.

In certain instances, the arm 332 may translate horizontally simultaneously with the locking pin 310. The simultaneously movement of the locking pin 310 and the arm 330 may be facilitating by a bracket 340 connecting the locking pin 310 and the arm 330. In instances where the locking pin 310 and the arm 330 are configured to translate simultaneously, the locking pin 310 may transition into the locked position simultaneously with the first stop mechanism 328 transitioning to the unblocking position. More specifically, the locking pin 310 may span the gap 318 between the first beam 302 and the second beam 304 while the arm 332 transitions the first stop mechanism 328 to the unblocking position.

Due to the crane interlock 300 being configured to safely and efficiently transfer the trolley hoist to the second beam 304, it may be beneficial for the second beam 304 to include similar safety measures that are included with the first beam 302 to ensure that the trolley hoist does not transition or move off of the second beam 302 when arranged therewith. Thus, the crane interlock 300 may include a second stop mechanism 344. The second stop mechanism 344 may be arranged at the lower surface 308 of the second beam 304 and extend therethrough. In addition, the second stop mechanism 344 may be configured to actuate between a blocking position and an unblocking position.

In order to transition the second stop mechanism 344 between the blocking position and the unblocking position, the arm 330 may be configured to extend across the gap 318 between the first beam 302 and the second beam 304 and transition the second stop mechanism 344 between the blocking position and the unblocking position. In certain instances, the arm 330 may include a second contact portion 342 to facilitate transitioning the second stop mechanism 344 between the blocking position and the unblocking position.

Similar to the first stop mechanism 328, the second contact portion 342 of the arm 330 may be configured to contact an upper portion 346 of the second stop mechanism 344. The upper portion 346 of the second stop mechanism 344 is connected to a second linkage 348, which is in turn connected to a blocking portion 350. The upper portion 346, the second linkage 348, and the blocking portion 350 together may form the second stop mechanism 344. The arm 330 is initially arranged within the bounds of the first beam 302 in the blocking position shown in FIG. 3. In transitioning the second stop mechanism 344 between the blocking position and the unblocking position, the arm 330 may translate horizontally in the first direction 316 and cross the gap 318 between the first beam 302 and the second beam 304. The second contact portion 342 of the arm 330 may contact the upper portion 346 of the second stop mechanism 344. The arm 330 may continue to translate horizontally and push the upper portion 346 of the second stop mechanism 344 horizontally along therewith. The movement of the upper portion 346 of the second stop mechanism 344 may in turn operate the second linkage 348, which may raise the blocking portion 350 of the second stop mechanism 344.

In certain instances, one or more motorized end trucks (e.g., as shown in FIG. 1) may be coupled to the first beam 302 and/or the second beam 304. The motorized end truck(s) (not shown) may be configured to position the first beam 302 adjacent the second beam 304. In other instances, the first beam 302 may be positioned adjacent the second beam 304 using another motorized mechanism.

It may be beneficial to determine that the first beam 302 is adjacent the second beam 304 and in a position for the crane interlock 300 to operate. Thus, the crane interlock 300 may include a proximity sensor 352. The proximity sensor 352 may be configured to indicate that the first beam 302 and the second beam 304 are aligned in a locking position. The proximity sensor 352 may be arranged on the first beam 302 and may be configured to sense the end 324 of the second beam 304. The proximity sensor 352 may utilize infrared sensing or other type of light energy sensing. In other instances, the proximity sensor 352 may be configured to sense a magnetic field originating from the second beam 304. The proximity sensor 352 may sense the magnetic field based on the material of the proximity sensor 352, or in other instances, a magnetic structure 354 may be arranged on the second beam 304. The proximity sensor 352 may be configured to sense the magnetic field originating from the magnetic structure 354.

The proximity sensor 352 may provide an indication to an operator of the crane interlock 300 and the trolley hoist that the first beam 302 and the second beam 304 are in a safe locking position. In certain instances, the proximity sensor 352 may provide an audible sound to indicate that the first beam 302 and the second beam 304 are in the locking position. In addition, the proximity sensor 352 may provide a visual indicator, in addition to or alternatively from the audible sound, to indicate that the first beam 302 and the second beam 304 are in the locking position.

The crane interlock 300 may include a control box 356 that is coupled to the proximity sensor 352. The control box 356 may include one or more visual indicators 358, 360 that may indicate that the first beam 302 and the second beam 304 are in the locking position. One of the indicators 358, 360 may signal that the first beam 302 and the second beam 304 are aligned and ready for the interlock engagement and the other of the indicators 358, 360 may signal that the first beam 302 and the second beam 304 are in the locked position.

In certain instances, the control box 356 may include control circuitry that is configured to sense whether the first stop mechanism 338 and/or the second stop mechanism 344 are in the unblocking position or the blocking position. More specifically, the control box 356 may be coupled to optional additional safety switches 362, 364. The additional safety switches 362, 364 indicate whether the first stop mechanism 338 and/or the second stop mechanism 344 are in the unblocking position or the blocking position. The operation of the safety switches 362, 364 is described in further detail below with reference to FIGS. 4A-C.

The control box 356 may be communicatively coupled to an operator station via a conduit 366. The operator station, via indication from the safety switches 362, 364 provided to the control box 356, may communicate with and toggle the crane to an immobile state during alignment of the first beam 302 and the second beam 304. The trolley hoist may communicate with the operator station via wireless signals such as Bluetooth, radio frequency (RF) signals, and/or Wi-Fi). The operator station may include a control panel to operate both the trolley hoist and the crane interlock 300.

The illustrative components shown in FIG. 3 are not intended to suggest any limitation as to the scope of use or functionality of embodiments of the disclosed subject matter. Neither should the illustrative components be interpreted as having any dependency or requirement related to any single component or combination of components illustrated therein. Additionally, any one or more of the components depicted in any of the FIG. 3 may be, in embodiments, integrated with various other components depicted therein (and/or components not illustrated), all of which are considered to be within the ambit of the disclosed subject matter. For example, the crane interlock 200 may include a second stop mechanism 344 and/or a proximity sensor 352.

Figure 4A:
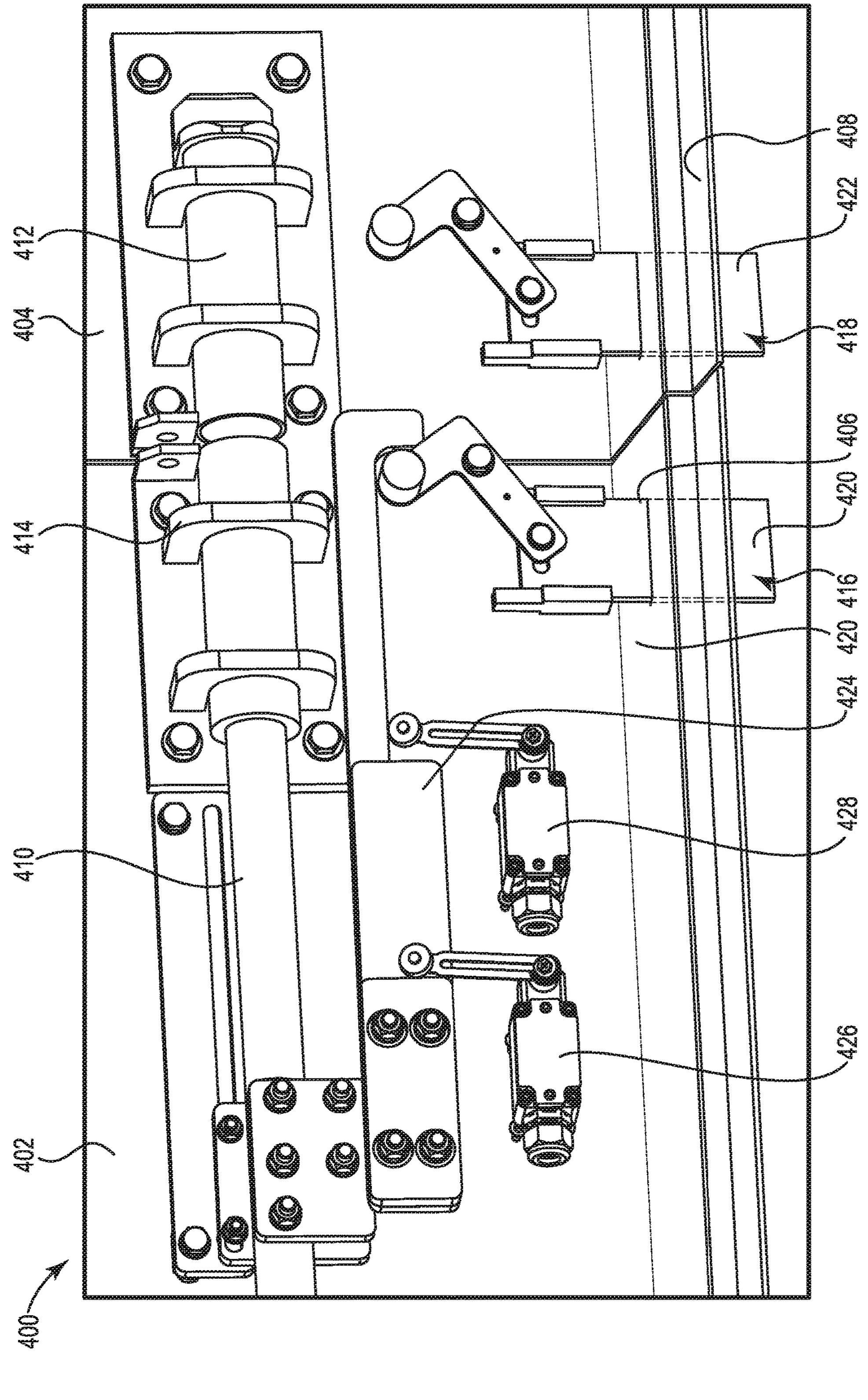
FIG. 4A is an illustration of an example beam interlock in a first configuration consistent with various aspects of the present disclosure.

FIG. 4A is an illustration of an example crane interlock 400 in a first configuration consistent with various aspects of the present disclosure. The crane interlock 400 may be used for releasably connecting a first beam 402 to a second beam 404. The first beam 402 may be mounted within a building structure similar to the bridge girder 104 discussed with reference to FIG. 1 and the second beam 404 may be secondary or extension beam structure to extend the operable range of a trolley hoist originally arranged with the first beam 402. The crane interlock 400 may be configured and arranged to ensure safety of the working environment in which the first beam 402 (and the trolley hoist arranged therewith) and the second beam 404 by releasably locking the first beam 402 to the second beam 404. More specifically, the trolley hoist may originally move along a lower surface 406 of the first beam 402. The trolley hoist may be configured to transition to the second beam 404 and move along a lower surface 408 thereof. As a result, the crane interlock 400 may temporarily or releasably lock the first beam 402 to the second beam 404 to provide a consistent transition between the lower surface 406 of the first beam 402 and the lower surface 408 of the second beam 404. Prior to operating the crane interlock 400, the first beam 402 may be arranged adjacent the second beam 404.

The crane interlock 400 may include a locking pin 410 arranged on the first beam 402 and configured to actuate between an unlocked position and a locked position. The locking pin 410 may transition horizontally translate toward the second beam 404 from the first beam 404. The locking pin 410 may be translated within a sleeve 412 arranged on the second beam 404. The locking pin 410 configured to receive the locking pin 410 in the locked position to releasably secure the first beam 402 to the second beam 404. In certain instances, the crane interlock 400 may also include an additional sleeve 414, arranged on the first beam 402, that may facilitate transitioning the locking pin 410 between the first beam 402 and the second beam 404. Each of the sleeve 412 and the additional sleeve 414 may provide structural stability to the locking pin 410 and may also mitigate against the first beam 402 separating from the second beam 404.

As noted above, the trolley hoist may be transferred from the first beam 402 to the second beam 404. In order to mitigate against the trolley hoist falling or moving off the first beam 402 or the second beam 404 when arranged thereon, the crane interlock 400 may include a first stop mechanism 416 arranged with the first beam 402 and a second stop mechanism 418 arranged with the second beam 404. The first stop mechanism 416 may include a blocking portion 420 that extends through the lower surface 406 of the first beam 402, and the second stop mechanism 418 may include a blocking portion 422 that extends through the lower surface 408 of the second beam 404. Each of the first stop mechanism 416 and the second stop mechanism 418 may be configured to actuate between a blocking position and an unblocking position.

To transition the first stop mechanism 416 and the second stop mechanism 418 to an unblocking position and to allow for the trolley hoist to transition between the first beam 402 and the second beam 404, the crane interlock 400 may include an arm 424. The arm 424 may be coupled to the locking pin 410 and may extend parallel therewith. The arm 424 may be configured to transition the first stop mechanism 416 and the second stop mechanism 418 between the blocking position and the unblocking position.

The crane interlock 400 may include a first safety switch 426 and a second safety switch 428. The arm 424 may be configured to contact each of the first safety switch 426 and the second safety switch 428 as is described in further detail below.

In the first configuration shown FIG. 4A, the first stop mechanism 416 and second stop mechanism 418 are arranged in the blocking position, the locking pin 410 is arranged within the bounds of the first beam 402 and not within the sleeve 412, and the arm 424 is not in contact with either of the first stop mechanism 416 and the second stop mechanism 418.

Figure 4B:
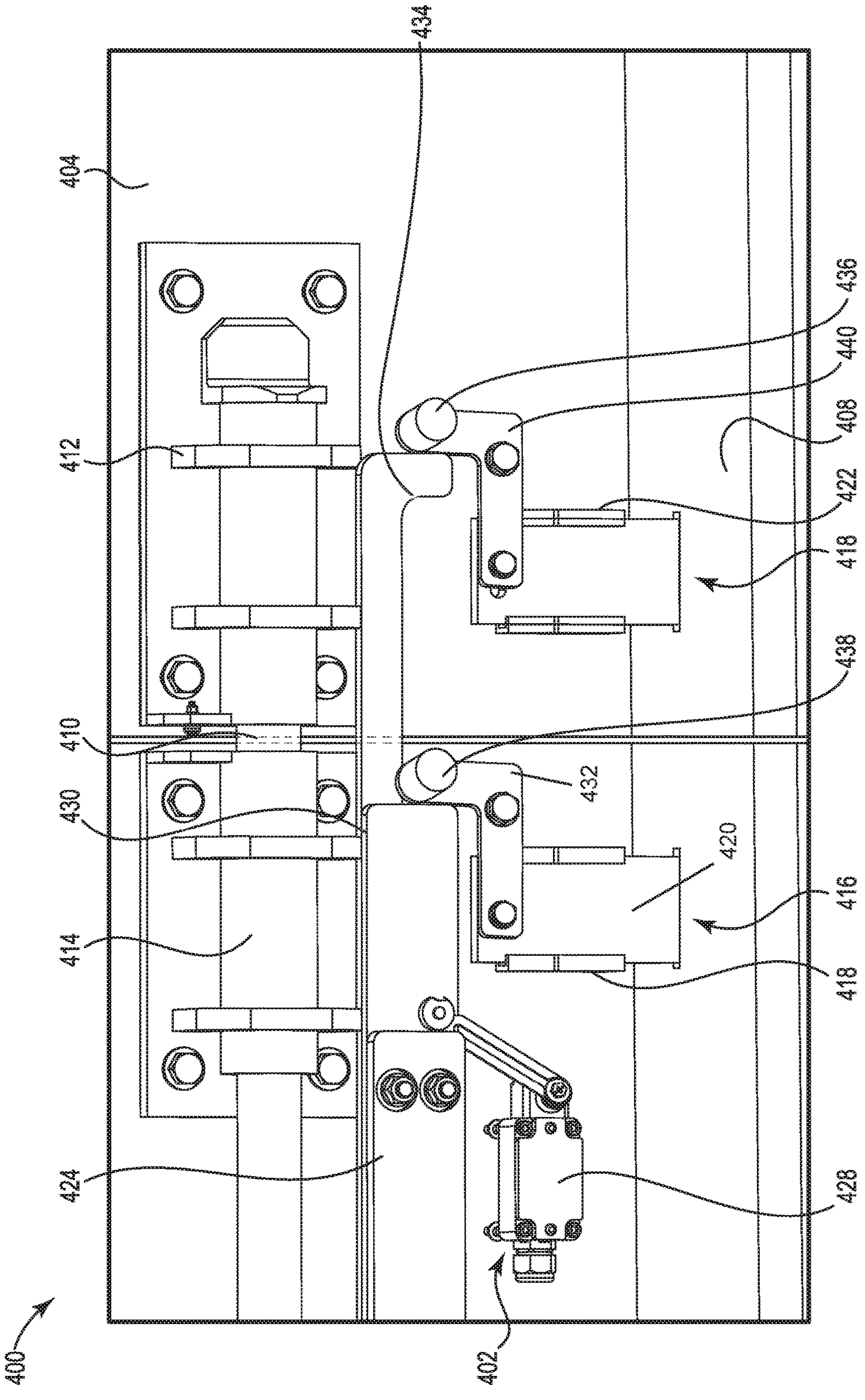
FIG. 4B is an illustration of the example beam interlock, shown in FIG. 4A, in a second configuration consistent with various aspects of the present disclosure.

FIG. 4B is an illustration of the example crane interlock 400, shown in FIG. 4A, in a second configuration consistent with various aspects of the present disclosure. In the second configuration shown FIG. 4B, the first stop mechanism 416 and second stop mechanism 418 are arranged in the blocking position, at least a portion of the locking pin 410 is arranged within the sleeve 412, and portions of the arm 424 are contact with portions of the first stop mechanism 416 and the second stop mechanism 418.

The locking pin 410 is actuated to span the first beam 402 and the second beam 404. In addition, the arm 424, coupled to the locking pin 410 and extending parallel therewith, is actuated simultaneously with the locking pin 410. A first portion 430 of the arm 424 may contact an upper portion 432 of the first stop mechanism 416 and a second portion 434 of the arm 424 may contact an upper portion 436 of the second stop mechanism 418.

The upper portion 432 of the first stop mechanism 416 is connected to a first linkage 438, which is in turn connected to the blocking portion 420. The upper portion 432, the first linkage 438, and the blocking portion 420 together may form the first stop mechanism 416. In addition, the upper portion 436 of the second stop mechanism 418 is connected to a second linkage 440, which is in turn connected to the blocking portion 422. The upper portion 436, the second linkage 440, and the blocking portion 422 together may form the second stop mechanism 418.

As shown in FIG. 4B, the first portion 430 of the arm 424 contacts the upper portion 432 of the first stop mechanism 416 and the second portion 434 of the arm 424 contacts the upper portion 436 of the second stop mechanism 418. Contact between the first portion 430 of the arm 424 and the upper portion 432 of the first stop mechanism 416 may occur substantially simultaneously with the second portion 434 of the arm 424 contacting the upper portion 436 of the second stop mechanism 418.

Figure 4C:
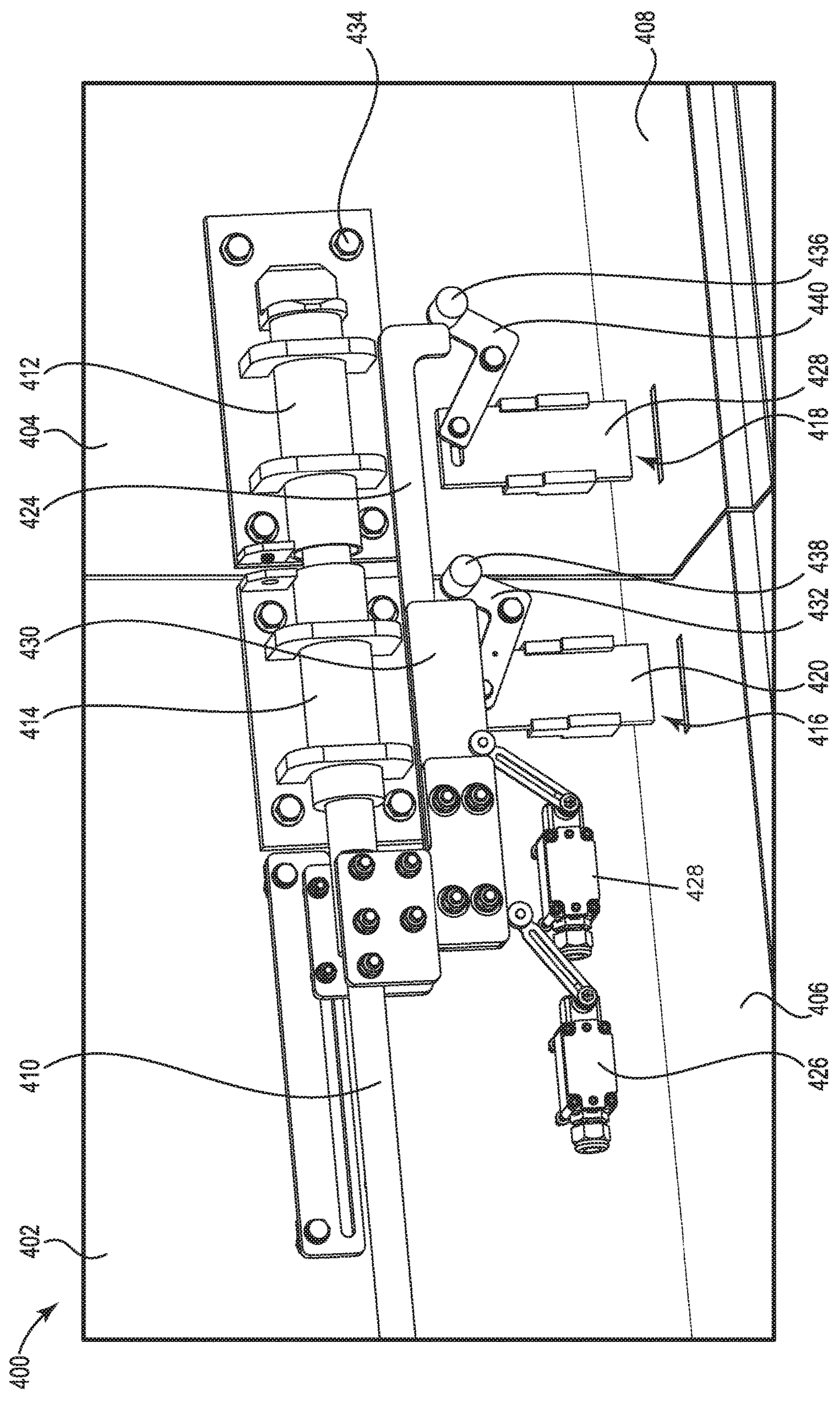
FIG. 4C is an illustration of the example beam interlock, shown in FIGS. 4A-B, in a third configuration consistent with various aspects of the present disclosure.

FIG. 4C is an illustration of the example crane interlock, shown in FIGS. 4A-B, in a third configuration consistent with various aspects of the present disclosure. In the third configuration shown FIG. 4C, the first stop mechanism 416 and second stop mechanism 418 are arranged in the unblocking position, the locking pin 410 is arranged within the sleeve 412, and the arm 424 contacts each of the first stop mechanism 416 and the second stop mechanism 418.

The arm 424 may transition the first stop mechanism 416 and the second stop mechanism 418 to the unblocking position. From the contact point shown in FIG. 4B, the first portion 430 of the arm 424 may continue to translate toward the second beam 404 and contact the upper portion 432 of the first stop mechanism 416. The arm 424 pushes the upper portion 432 of the first stop mechanism 416 horizontally along therewith. In addition, the second portion 434 of the arm 424 similarly pushes the upper portion 436 of the second stop mechanism 418. The movement of the upper portion 432 of the first stop mechanism 416 may in turn operate the linkage 438, which may raise the blocking portion 420 of the first stop mechanism 416. Similarly, the movement of the upper portion 436 of the second stop mechanism 418 may in turn operate the linkage 440, which may raise the blocking portion 422 of the second stop mechanism 418. In addition, the locking pin 410 is received in the sleeve 412 arranged on the second beam 404 to releasably secure the first beam 402 to the second beam 404.

In the third (unblocking) configuration shown in FIG. 4C, the trolley hoist may transition between the first beam 402 and the second beam 404. The crane interlock 400 is configured to allow movement of the trolley hoist along the lower surface 406 of the first beam 402 and along the lower surface 408 of the second beam 404. In the first (blocking) configuration shown in FIG. 4A, however, the crane interlock 400 is configured to allow movement of the trolley hoist along the lower surface 406 of either the first beam 402 or the lower surface 408 of the second beam 404, depending on which of the first beam 402 and the second beam 404 the trolley hoist is arranged with, and mitigate against movement of the trolley hoist to whichever of the lower surface 406 of the first beam 402 and lower surface 408 of the second beam 404 the trolley hoist is not arranged with.

In addition and as shown in FIG. 4C, the first safety switch 426 and the second safety switch 428 have been actuated from the initial positioning shown in FIG. 4A. Each of the first safety switch 426 (Line not located on FIG. 4C properly) and the second safety switch 428 may be actuated by the arm 430. When actuated, the first safety switch 426 may immobilize the crane. As detailed in FIG. 3, the first safety switch 426 and the second safety switch 428 may be coupled to a control panel that may be coupled to and configured to operate—the trolley hoist, crane, and the crane interlock 400. Thus, the control panel transmits a signal to immobilize the trolley hoist when the first safety switch 426 has been actuated. Even if the operator tries and moves crane, the crane will have no power. The second safety switch 428 may indicate that the locking pin 410 is in position within the sleeve 412, and that the first beam 402 and the second beam 404 are in a locked position. In certain instances, the second safety switch 428 may turn on an audible or visual indicator (e.g., as described above with reference to FIG. 3). Actuating of the locking pin 410, the arm 430, raising of the first stop mechanism 416 and the second mechanism 418, and actuating the first safety switch 426 and the second safety switch 428 may occur as part of a simultaneous process. More specifically, each of the locking pin 410, the arm 430, the first stop mechanism 416, the second mechanism 418, the first safety switch 426, and the second safety switch 428 may reach the configuration shown in FIG. 4C, transitioning from the configuration shown in FIG. 4A, at the same time.

After transition of the trolley hoist back from the (temporary) the second beam 404 to the first beam 402, the first stop mechanism 416 and the second mechanism 418 may be transitioned into the blocking position. To do so, the arm 430 and the locking pin 410 may be actuated back toward the first configuration shown in FIG. 4A. Without the arm 430 holding the upper portion 432 of the first stop mechanism 416 and the upper portion 436 of the second stop mechanism 418, the blocking portion 420 of the first stop mechanism 416 and the blocking portion 422 of the second stop mechanism 418 transition automatically, respectively, through the lower surface 406 of the first beam 402 and along the lower surface 408 of the second beam 404.

The illustrative components shown in FIGS. 4A-C are not intended to suggest any limitation as to the scope of use or functionality of embodiments of the disclosed subject matter. Neither should the illustrative components be interpreted as having any dependency or requirement related to any single component or combination of components illustrated therein. More specifically, the first beam 402 and/or the second beam 404 may include end trucks 110, 111 as described above with reference to FIG. 1. In addition, the crane interlock 400 may include a proximity sensor 352 as described above with reference to FIG. 3. Additionally, any one or more of the components depicted in any of the FIG. 4A-C may be, in embodiments, integrated with various other components depicted therein (and/or components not illustrated), all of which are considered to be within the ambit of the disclosed subject matter.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. An interlock apparatus for releasably connecting a first beam to a second beam, the interlock apparatus comprising:

a locking pin arranged on the first beam and configured to actuate between an unlocked position and a locked position;

an arm coupled to the locking pin and extending parallel therewith, the arm being configured to transition a first stop mechanism between a blocking position and an unblocking position, the first stop mechanism being arranged at a lower surface of the first beam and extending therethrough;

a sleeve arranged on the second beam and configured to receive the locking pin in the locked position to releasably secure the first beam to the second beam; and a proximity sensor configured to indicate that the first beam and the second beam are aligned in a locking position.

2. The interlock apparatus of claim 1, wherein the locking pin is configured to actuate the arm parallel to the lower surface of the first beam simultaneously therewith in transitioning between the unlocked position and the locked position.

3. The interlock apparatus of claim 1, wherein the first stop mechanism includes a linkage arranged with the first stop mechanism, the arm being configured to contact the linkage to transition the first stop mechanism between the blocking position and the unblocking position.

4. The interlock apparatus of claim 3, wherein the arm is configured to separate from the linkage in the blocking position.

5. The interlock apparatus of claim 1, further comprising a second stop mechanism arranged at a lower surface of the second beam and extending therethrough and configured to actuate between a blocking position and an unblocking position.

6. The interlock apparatus of claim 5, wherein the arm is configured to extend between the first beam and the second beam and transition the second stop mechanism between the blocking position and the unblocking position.

7. The interlock apparatus of claim 1, further comprising at least one motorized end truck configured to position the first beam adjacent the second beam.

8. The interlock apparatus of claim 1, further comprising a magnetic structure arranged on the second beam, and wherein the proximity sensor is arranged on the first beam and configured to sense a magnetic field from the magnetic structure.

9. A system comprising:

a trolley hoist configured to hoist material from an overhead position;

an interlock mechanism configured to releasably secure a first beam to a second beam including:

a locking pin arranged on the first beam and configured to actuate between an unlocked position and a locked position;

a first stop mechanism arranged at a lower surface of the first beam and extending therethrough and configured to actuate between a blocking position and an unblocking position, a second stop mechanism arranged at a lower surface of the second beam and extending therethrough and configured to actuate between a blocking position and an unblocking position, an arm coupled to the locking pin and extending parallel therewith, the first arm being configured to transition the first stop mechanism between the blocking position and the unblocking position and the second mechanism between the blocking position and the unblocking position, and a sleeve arranged on the second beam and configured to receive the locking pin in the locked position; and a proximity sensor configured to indicate that the first beam and the second beam are aligned in a locking position.

10. The system of claim 9, wherein the first stop mechanism and the second stop mechanism are configured to:

allow movement of the trolley hoist along the lower surface of one of the first beam and the second beam and mitigate against movement of the trolley hoist along the lower surface of the other of the first beam and the second beam in the blocking position, and allow movement of the trolley hoist along the lower surface of the first beam and along the lower surface of the second beam in the in the blocking position.

11. The system of claim 9, further comprising an alignment apparatus configured to align the first beam and the second beam.

12. The system of claim 9, further comprising a drive mechanism configured to simultaneously actuate the locking pin and the arm.

13. The system of claim 12, further comprising a control mechanism configured to maintain the locking pin in the locked position in an activated state, and release the locking pin to the unlocked position in an inactive state.

14. The system of claim 13, wherein the control mechanism is further configured to release the first stop mechanism to the blocking position and the second stop mechanism to the blocking position in the inactive state.

15. The system of claim 12, wherein the control mechanism is further configured to toggle the trolley hoist to an immobile state during alignment of the first beam and the second beam.

16. A method for releasably connecting a first beam to a second beam, the method comprising:

arranging the first beam adjacent the second beam;

actuating a locking pin, arranged on the first beam, to span the first beam and the second beam;

actuating an arm, coupled to the locking pin and extending parallel therewith, simultaneously with the locking pin and transitioning a first stop mechanism between a blocking position and an unblocking position, the first stop mechanism being arranged at a lower surface of the first beam and extending therethrough; and using a proximity sensor to indicate that the first beam and the second beam are aligned in a locking position; and receiving the locking pin in a sleeve arranged on the second beam to releasably secure the first beam to the second beam.

17. The method of claim 16, further comprising determining the first beam is adjacent to the second beam.

18. The method of claim 16, wherein actuating the arm simultaneously with the locking pin comprises transitioning a second stop mechanism between a blocking position and an unblocking position, the second stop mechanism being arranged at a lower surface of the second beam and extending therethrough.

* * * * *